United States Patent [19]

Cohen

[11] Patent Number: 4,852,524
[45] Date of Patent: Aug. 1, 1989

[54] GAS FIRED WATER HEATER
[75] Inventor: Kenneth W. Cohen, Fort Lee, N.J.
[73] Assignee: Aerco International, Inc., Northvale, N.J.
[21] Appl. No.: 208,138
[22] Filed: Jun. 16, 1988
[51] Int. Cl.$^4$ .................. F22B 37/42; F22D 5/00
[52] U.S. Cl. ................... 122/448 R; 122/32; 126/351; 236/18
[58] Field of Search .............. 236/18, 23, 24; 122/32, 122/33, 448 R; 126/351

[56] References Cited

U.S. PATENT DOCUMENTS

| | | |
|---|---|---|
| 884,223 | 4/1908 | Shipley . |
| 1,485,897 | 3/1924 | West et al. . |
| 2,759,328 | 8/1956 | Cockrell . |
| 3,190,283 | 6/1965 | Miyahara . |
| 3,648,682 | 3/1972 | Bougard . |
| 3,721,386 | 3/1973 | Brick et al. . |
| 3,826,240 | 7/1974 | Miyahara . |
| 4,014,316 | 3/1977 | Jones et al. . |
| 4,256,176 | 3/1981 | Cohen . |
| 4,275,708 | 6/1981 | Wood . |
| 4,305,547 | 12/1981 | Cohen . |
| 4,385,723 | 5/1983 | Sanborn et al. ............ 236/18 |
| 4,644,906 | 2/1987 | Garabedian et al. .......... 122/32 |
| 4,770,161 | 9/1988 | Charron ................ 122/448 X |

Primary Examiner—Edward G. Favors
Attorney, Agent, or Firm—Brumbaugh, Graves, Donohue & Raymond

[57] ABSTRACT

A novel semi-instantaneous, modulating and condensing gas fired water heating system having a very high dynamic response for supplying potable water on demand at a substantially constant, controlled temperature having a maximum output of approximately 1,000,000 BTU/hour is provided. The device includes combustion means, heat exchanger means, and temperature control means having thermal measuring means and controlling means for controlling the rate of heat transfer in anticipation of changes in BTU requirements. The heat exchanger includes a combustion chamber open at its bottom to receive the combustible mixture of air and gas burned by the combustor. Enclosing the combustion chamber is a water chamber having a channel defined by the walls of the combustion and water chambers. Through the channel flows upwards the liquid, preferably water, to be heated. A plurality of tubes extend through and from the top of the combustion chamber along the outside and length thereof, preferably in helical fashion, to form a conduit for the hot fluids to pass in counterflow to and in heat exchange relation with the liquid. The gases are cooled in traversing the counterflow heat exchanger below the due point of the gases causing the vapor in the gases to condense.

34 Claims, 6 Drawing Sheets

GAS FIRED WATER HEATER

BACKGROUND OF THE INVENTION

The present invention relates to a fluid heating device with very high dynamic response, and more specifically, to a novel and highly effective and efficient semi-instantaneous, modulating and condensing gas fired water heating system for supplying potable water on demand at a substantially constant, controlled temperature having a maximum output of approximately 1,000,000 BTU/hour.

Hot water temperature control devices have conventionally included heat exchangers to accomplish heat transfer between water which rapidly flows within tubes and a heat source, either steam or gas, exposed to the outside of the tubes. These systems, generally termed "instantaneous", produce fluctuating temperatures as a result of fluctuating flow and input energy. For example, if the system has an increased change in flow (increase demand for hot water) the temperature of the water will start to decay immediately since the temperature droop is a function of the rate of change of load (flow). In fact, if the load changed instantaneously from 0 to 100% (or to maximum) the outlet water temperature could momentarily drop to close to the inlet water temperature.

Because of the delay (time to increase energy as a result of increased flow and time for water to absorb energy), there is a limit to the gain (amount of energy input per unit of temperature change), which causes droop in the system. For instance, if a device is set for 140° temperature output at low flow, there typically could be a 20°–25° droop under steady state conditions, meaning for a 100% flow there would be a drop in the output temperature of 20°–25°. The temperature errors resulting from poor dynamic response are superimposed on the steady state temperature error that results from the low gains necessary for system stability.

As a result of such poor temperature control, storage tanks are usually employed for use with the instantaneous system to store heated water at a fixed temperature; in one embodiment water is pumped at a constant rate through the system to keep the temperature constant. Other methods include heating the stored water without pumping means and relying on natural convection to accomplish temperature control. Because the use of the storage tank does not by itself solve the problem of temperature control, devices, such as described by the present applicant in U.S. Pat. No. 4,305,547, have been established to improve temperature control. In the '547 patent, the applicant herein provided, in an improvement over thermostat and plumbing control devices, a system wherein a combined set point and feed forward control is established that minimizes fluctuations in the temperature of the hot water by anticipating changes in BTU requirements. Such a system is based on an indirect (liquid or steam) method of supplying the energy source to the heat exchanger. In contrast, the tenuous nature of the energy input in a direct fired format such as utilized herein makes temperature control significantly more difficult and requires an even greater degree of sophistication than that described in the '547 patent.

Another problem of prior art systems, whether condensing or noncondensing, relates to total system efficiency, i.e., unit efficiency and distribution system efficiency. These efficiencies affect significantly the cost of fuel per delivered gallon of water. Typically, efficiencies are based upon laboratory conditions at rated (or maximum) load—a continuous operation of rated load. However, in the commercial application for potable water, the load diversity (meaning the load profile) is anything but continuous or constant, i.e., it fluctuates greatly over a period of time. For instance, the loads are higher in the mornings because of concentrated water use whereas in the afternoon the loads are lower since less people require water. Because all systems supply only the energy used, the heating (the input energy) must cycle on and off to supply the reduced load in the afternoon or, as the case may be, the increased load in the mornings. Normally, as load decreases, the unit (heat) cycles on and off to meet load; total energy supplied is sought to equal the reduced energy utilized. It is understood in the art that such cycling reduces efficiency.

Also, as a result of the characteristics of some prior art devices, particularly non-condensing systems, aside from the drawbacks of utilizing a storage tank and distribution and recirculation pumping, system efficiency is inadequate. Poor temperature characteristics and general unawareness of the instantaneous temperature in the distribution systems requires that the temperature be maintained significantly higher than necessary to prevent decay to unacceptable levels of temperature under load. The difference between this distribution temperature and the required use temperature produces continuous energy losses throughout the distribution system. These losses and increased probabilities of scalding are a consequence of existing technology.

Other problems of present devices relate to efficiency performance. For instance, the energy not absorbed by the fluid and not extracted by the flue are lost to the ambient air because the gases are in heat exchange relation not only with the fluid but also the ambient air. In addition, most gas-fired systems attempt to increase the surface area of the gas side of the tubes (to increase the ability of gas to transfer its heat) by using fins, which have the characteristic of trapping flue products causing carbon buildup. The greater build-up of carbon the worse heat transfer becomes. As a result, there is a loss of efficiency and users are left with the laborious task of opening and cleaning the heat exchanger.

SUMMARY OF THE INVENTION

It is the primary object of the present invention to eliminate these deficiencies and provide a novel semi-instantaneous, modulating and condensing gas fired water heating system having a very high dynamic response for supplying potable water on demand at a substantially constant, controlled temperature having a maximum output of approximately 1,000,000 BTU/hour. It is a further object of the invention to provide an economically efficient and effective heating unit and system which responds rapidly and safely to changes in hot water demand without the need of storage.

Unlike prior art systems, an embodiment of the present invention is a modulating and condensing direct fired water heating system. It is devised to maintain substantially constant temperature by modulation in an environment of varying load so that the input energy matches the output energy at all conditions. The system as described allows the input energy to be modulated continuously over a broad range, typically 20-1 (50,000–1,000,000 BTU). [Below 50,000 BTU it would cycle.] In so doing, the efficiency increases with decreasing demand from a design minimum (for typical in-the-water temperature of 70° F.) of approximately 93% at 1,000,000 BTU to greater than approximately 99% at 50,000 BTU. [The efficiency can exceed 100%.] High efficiency (99%) occurs as the gases, which provide heat for the water, are cooled in traversing the counterflow heat exchanger below the due point of the gases causing the vapor in the gases to condense; it would be only approximately 89% efficient since this is the maximum theoretically achievable point without condensing. In this way, the modulating system utilizes, unlike prior devices, the additional energy through the heat of condensation available as a consequence of the condensing process. The heat exchanger here is designed to allow condensing in a benign fashion.

These objects and characteristics are achieved, in accordance with the present invention, by providing a novel combination of several components including a combustion system for igniting a combustible mixture of air and gas, heat exchanger means for providing heat transfer between the fluid output of the combustion system and potable water, and a temperature control system including a thermal measuring device and controls for controlling the rate of heat transfer between the ignited gases and the water.

The combustor preferably comprises a nozzle mix burner (as opposed to a premix burner) capable of mixing the air and gas for a complete high quality combustion over a broad range of flows (typically 20-1) resulting in high combustion efficiency thus producing very low combustibles. Specifically, the burner comprises a substantially cylindrical air chamber having a circular top plate, and a smaller cylindrical gas pipe, open at its bottom, extending from the base of the air chamber, through the center thereof, to just above the top plate where it is capped with a gas cap. The air enters the side of the chamber and exits at ports in the top plate of the chamber; the gas enters at the bottom of the gas pipe and exits for mixing with the air at ports in the gas cap.

Preferably, gas tubes extend radially outwards from the gas pipe to introduce gas for mixing with air at the periphery of the air chamber. Spinner vanes are also preferably provided at the periphery to accelerate such mixing. The spinners are in asymmetric relation with the radial gas tubes. As a result of such spinning, of introducing the majority of gas just above the air ports, and of the specific arrangement of the ports, a particular asymmetric environment is created preventing combustion driven oscillation or other instabilities, causing the gases to burn at a very high velocity close to the surface of the gas plate, reducing burning delay and generally increasing the stability of the system.

The heat exchanger means includes a hollow combustion chamber open at its bottom to receive the ignited gases from the burner. It is enclosed at its top. A water chamber encloses the combustion chamber and defines a water channel between the two chambers' walls. A plurality of exchange tubes each extend from and preferably helically around the length of the combustion chamber through the channel forming a conduit for the ignited gases to travel from ignition in the combustor upwards through the combustion chamber and downwards through the tubes in heat exchange relation with the water entering and passing in counterflow through the channel. The ignited gases exit into an exhaust gas manifold, which guides the exhausted gases outside the system through an exhaust gas stack. The manifold also acts as a condensate drainage collecting the condensate resulting from the condensation of the gases in the tubes.

A temperature control system is provided which includes a thermal measuring device and controls. The thermal measuring device is provided for sensing the temperature of a mixture of incoming and outgoing portions of the liquid, and for establishing a pressure difference between the incoming and outgoing portions depending on the flow rate of the liquid through the heat exchanger such that a relative ratio of the portions depends linearly on the flow rate of the liquid. In this manner, an increase in the liquid demand causes a change in relative flow and consequently in the temperature of the mixture, thereby indicating a necessity to change proportionally the amount of input energy. The implementation of a hydraulic zero adjuster and pump enables the system to accurately respond to changes in flow even when flow is below 10% of maximum.

The control means includes signal means for generating a signal combined feedback and feed forward control means and air/fuel train means responsive to the signal for providing through an air/fuel valve separate flows of air and gas to the combustion means. The gas flow is linear with rotation of the air/fuel valve, preferably a rotary valve, which itself is linearly responsive to the signal. The air/gas ratio of air and gas fed to the combustion chamber is maintained at a programmed relationship as a function of input gas flow.

The air/fuel train further comprises a gas and air inlet, gas valve means for selectively opening and closing the flow of gas, regulator valve means for holding the pressure drop of the gas constant across the air/fuel valve, and a blower for accelerating the flow of air.

BRIEF DESCRIPTION OF THE DRAWINGS

The foregoing, and other objects, features and advantages of the invention will be more clearly understood from the following detailed description taken in conjunction with the accompanying drawings in which.

DETAILED DESCRIPTION OF THE INVENTION

Figure 1:
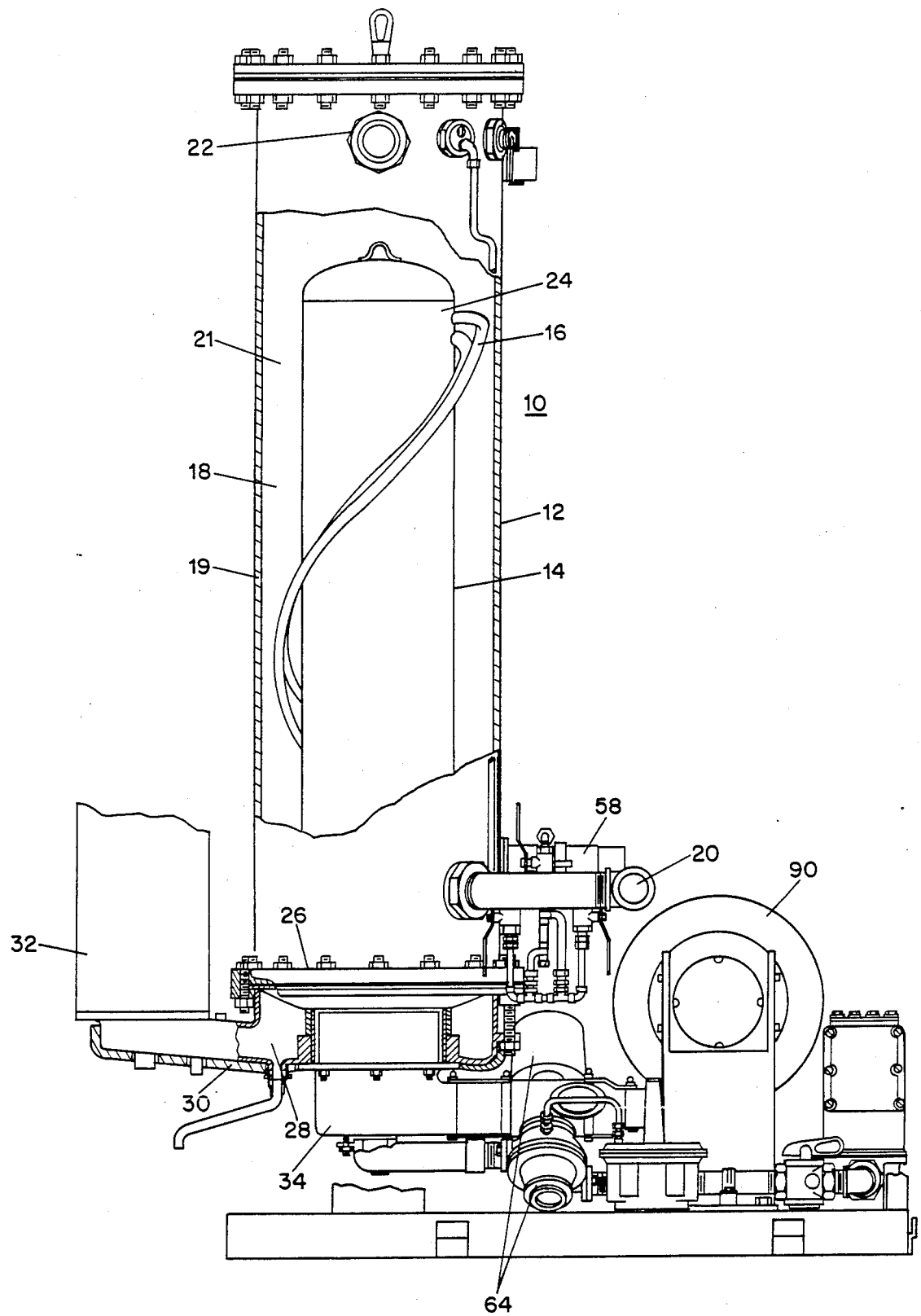
FIG. 1 is a diagrammatic view of the gas fired water heater system in accordance with the present invention.

Referring to the drawings and in particular FIG. 1, the gas fired water heater temperature control system according to the invention is indicated generally by the numeral 10. The system is designed for applications exhibiting diversity and specifically to deliver a liquid, preferably hot water both at a constant, controlled temperature, and at a variable flow rate, depending on the demands made by hot-water faucets, showers, and washing machines for clothes and dishes. Generally, the controlled temperature will have a set point, which typically for showers would be approximately 120° F., and the system will be capable of delivering an output of approximately 1,000,000 BTU/hour.

The system 10 comprises a heat exchanger 12 for providing heat transfer between a fluid, preferably hot gases, and a liquid, preferably water, such that as the water travels upwards within the heat exchanger it increases in temperature establishing a temperature gradient in the direction of flow of water. The heat exchanger 12 includes a combustion chamber 14 and at least one but preferably a plurality of tubes 16 extending around the combustion chamber for containing the hot gases and providing means of travel for the hot gases through the heat exchanger 12.

Also included in the heat exchanger 12 is a water chamber 18 enclosing the combustion chamber 14 and tubes 16. Between the combustion chamber 14 and the shell 19 of water chamber 18 is channel 21. The water chamber 18 has an inlet 20 for admitting the water into the water channel 21 and outlet 22 for withdrawing the water out of the channel 21 after the water reaches the approximate set point temperature. In this manner, the water travels upwards in channel 21 in physical isolation from but in heat exchange relation with the hot gases first passing upwards through chamber 14 and then directed downwards in tubes 16 in counterflow to the water, i.e., the hot gases travel upwards through the combustion chamber but then downwards through the tubes 16 in the opposite direction from the water, which travels upwards, establishing a temperature gradient in the water in the direction of its flow.

Figure 1A:
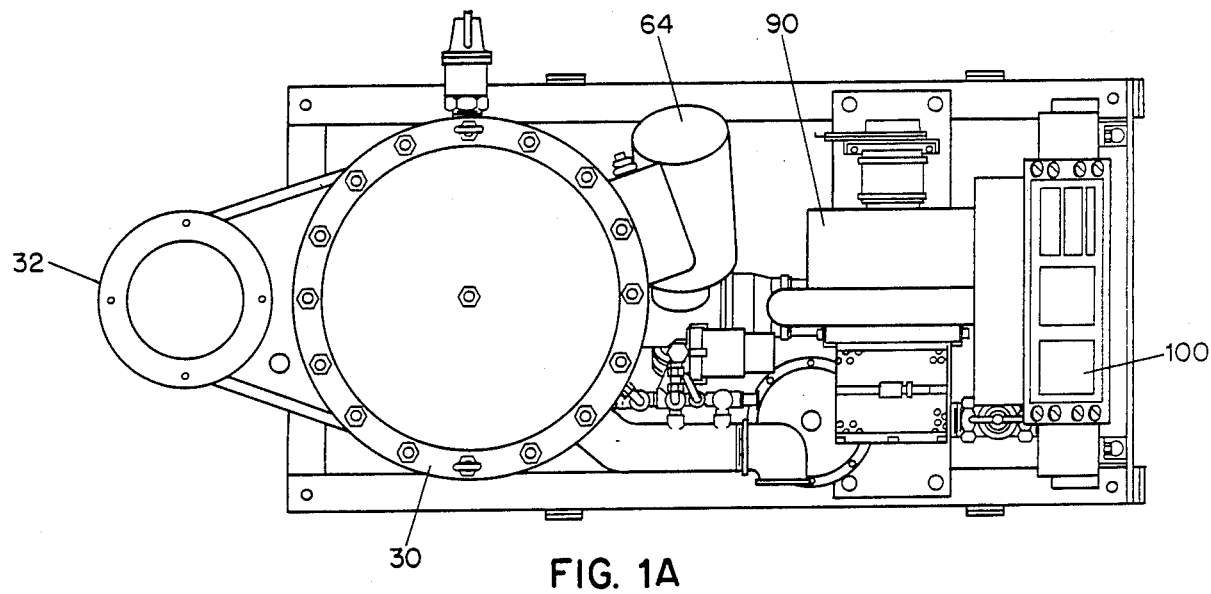
FIG. 1A is a top view of the exhaust gas manifold, of features of the controlling system and diagnostic display, in accordance with the present invention.

The tubes 16 extend from the top 24 and around the combustion chamber through the base 26 of the water chamber and into an area 28 defined by an exhaust gas manifold 30 located below the water and gas chambers. A top view of the exhaust gas manifold 30 is shown in FIG. 1A. The manifold 30 guides the exhausted gases outside the system through an exhaust gas stack 32, and acts as a condensate drainage collecting condensate resulting from the condensation of the gases in the tubes.

Preferably, there are 48 equally spaced apart tubes 16 made of copper or other copper bearing alloys which extend helically around the combustion chamber 14. This particular mechanical arrangement of the tubes is provided for a number of reasons. First, the circular arrangement of the tubes around the combustion chamber 14 allows for the reduction of the physical height of the unit, which eases transportation through doorways and ceilings of standard height, and reduces the amount of space that would be necessary ;or the unit if parallel tubes were employed having the same surface area as the circular tubes. Second, the circular arrangement adds life to and reduces stress on the unit since the thermal stresses that occur from rapid changes in temperature and pressure are absorbed by the bending of the tubes rather than at the joints of the unit. Next, the wide spacing (a minimum of ¼") between and helix angle (45°) of the tubes allows scale chips that come free from shock to settle to the bottom of the unit. Fourth, the circular arrangement is implemented without supporting baffles between the tubes which tend to create erosion, failure points due to erosion, and nucleation cites for scale buildup; scale or other contaminants which "flake off" settle at the bottom of the exchanger as opposed to collecting on baffles. The tubes are brazed rather than welded to the top 24 of the combustion chamber 14 and to the base 26, aiding in stress distribution as well as eliminating the potential for crevice corrosion. Full fillets resulting from brazing also eliminate the potential for a nucleation site for scale growth.

The helical tubes also improve heat transfer on one hand outside the tubes by insuring that water will pass in heat transfer relation with the gases flowing inside the tubes since lateral space within the channel 21 is covered, and on the other hand inside the tubes by increasing turbulence over that which would occur in straight tubes.

These and additional features of the tubes 16 not only minimize mechanical stresses but also allow condensing within the tubes in a benign fashion, prevent concentration of condensate, and minimize re-evaporation, all of which minimize erosion of the metal materials used.

In a preferred embodiment, each tube 16 has one elbow at the top and then continues in a single 45 degrees sweep to the bottom of the exchanger. Thus, fluids drain easily. Further, rather than closely spaced fins as in traditional exchangers the present invention uses large bore tubes, which also aid in reducing the potential for the accumulation of flue products within the tubes. The tubes 16 preferably are smooth bore, also minimizing fluid attachment. The velocity of gases passing through each tube is quite high helping to sweep fluid out as well as aiding to thin the boundary layer, reducing the concentration of condensate as well as improving heat transfer.

The unit modulates over a very broad range causing the onset of condensation to occur at varying positions along the length of the tube; thus, corrosion that does occur is distributed along the area covered by the movement of the condensation zone. The movement of the condensate also acts to sweep out any carbon particles that may accumulate in the tubes. This helps maintain heat transfer.

The condensate itself, produced when the gases are cooled in traversing the counterflow heat exchanger 12 below the dew point of the gases (causing the vapor in the gases to condense), provides additional energy through the heat of condensation.

Figure 2:
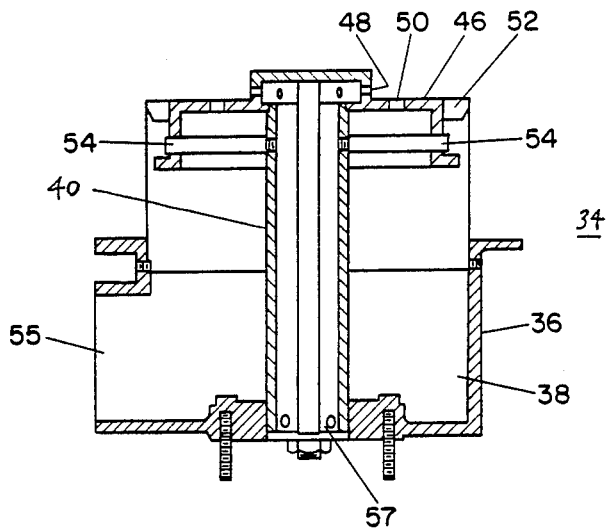
FIG. 2 is a side cross-sectional view of the combustor for the gas fired water heater system in accordance with the present invention.
Figure 3:
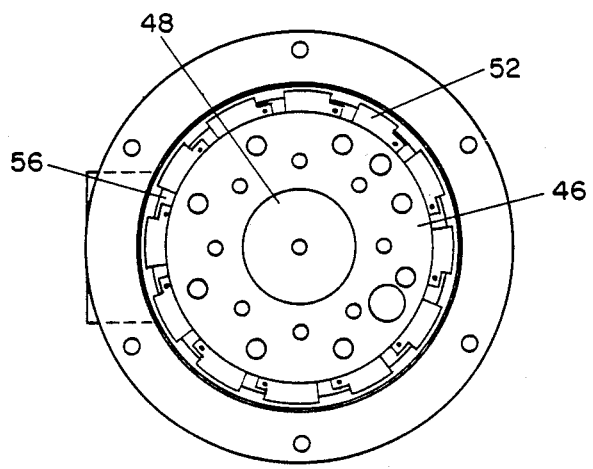
FIG. 3 is a top view of the combustor for the gas fired water heater system in accordance with the present invention.

Below the combustion and water chambers and partially surrounded by the exhaust gas manifold 30 is located the burner or combustor 34, which efficiently ignites a combustible mixture of air and gas to provide the hot gases used to heat the water. The combustor, shown in greater detail in FIGS. 2 and 3, is a substantial modification of the system for heating fluids described in U.S. Pat. No. 4,014,316 to Jones et al., which system has been assigned to the British Gas Corporation PLC and is licensed for use by Aerco International, Inc., the assignee herein.

The combustor 34 is preferably an inconel nozzle mix burner having an outer shell 36 defining an air chamber 38 enclosing a gas pipe 40. The top of the chamber comprises a top plate 46 having gas ports 48 and air ports 50 for release of gas and air, respectively. The gas ports 48 are situated above and perpendicular to the air ports 50 in such a manner as to introduce the gas above and at a right angle to the released air to provide an immediate collision just above the top plate 46 for stable burning at variable energy release rates without combustion driven oscillation.

Preferably, air is also released at the periphery 52 of the chamber and mixed with gas below the top plate 46, the gas reaching the periphery 52 by means of gas tubes 54 which extend radially outwards from gas pipe 40. Above the area for the collision of air and gas at the periphery is preferably provided spinners or vanes 56, which circulate the mixture above the top plate 46. The spinners are in asymmetric relation with the radial tubes.

Figure 4:
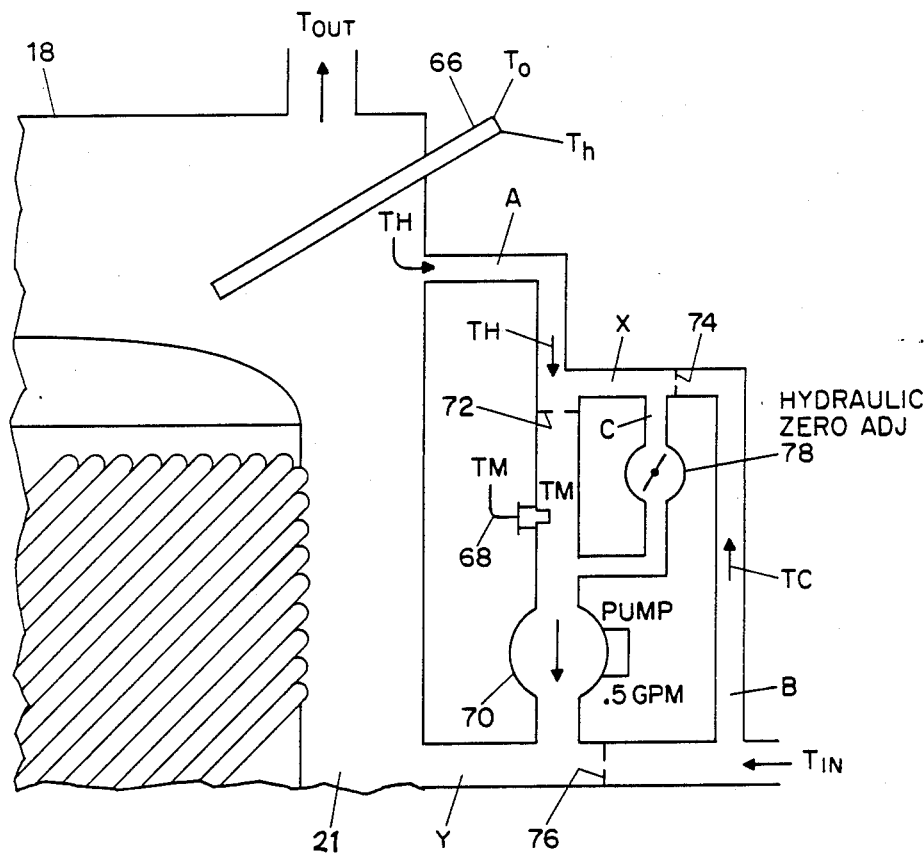
FIG. 4 is a fragmentary diagrammatic view of the thermal measuring means for the gas fired water heater system in accordance with the present invention.
Figure 4A:
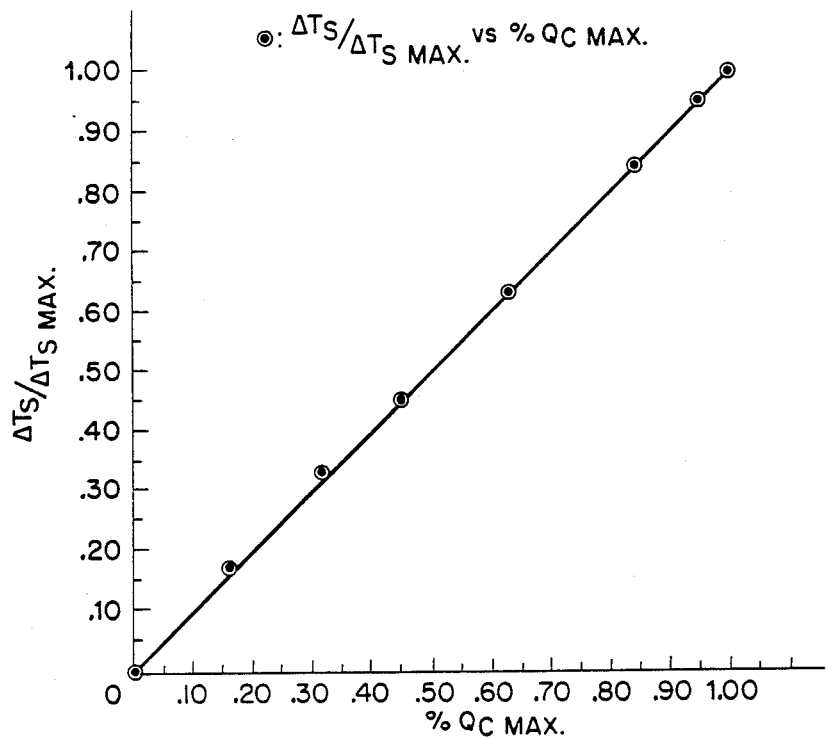
FIG. 4A is a graph showing relationships characteristic of the present invention.

In a particular embodiment of the combustor 34, air enters air entry 55 and gas enters gas entry 57, each traveling through the chamber 38 and gas pipe 40, respectively, exiting at the gas and air ports of the top plate or at the periphery of the chamber, as the case may be, for efficient and effective ignition. Unlike the '316 patent to Jones et al., the specific arrangement here of the gas ports 48, air ports 50 and periphery exits along with the spinners creates an asymmetric, stable environment which prevents combustion driven oscillation or other instabilities and fosters efficient burning over a broad flow range of air and gas. This results in low emissions at a very high energy release rate of greater than 500,000 BTU per hour per cubic foot of volume, utilizing low gas and air pressures. Referring to FIGS. 1, 4, 4A and 4B, the temperature control system comprising a thermal measuring means 58 and control system 62 will now be described. Thermal measuring means or a BTU rate transmitter controller 58 is provided to anticipate changes in BTU requirements in the system. Its operation is based in part on a mathematical analysis described in part at columns 5-6 in U.S. Pat. No. 4,305,547 to the present applicant. With reference to FIG. 4 the functioning of the BTU rate transmitter is based on the relationship between hot and cold stream temperatures and the flow of the hot and cold stream, which can be stated as follows:

$$TM = \frac{(QH)(TH) + (QC)(TC)}{QC + QH},$$

where  $QH$ = flow hot stream
$QC$ = flow cold stream
$TH$ = hot stream temperature
$TC$ = cold stream temperature
$TM$ = bulk average temperature resulting from mixing the separate fluid streams
$CP$ = specific heat
$W$ = a constant (gallons/minute)
$q$ = $KQ(TH - TC)$ BTU/Hour Where $QT = QC + QH$ (total stream flow), $$TM = \frac{(QH)(TH) + (QC)(TC)}{(QT)}$$

At constant flow, $QT = K$;

$$\Sigma QT = K = QC + QH.$$

Therefore, $QH = K - QC$ and it follows that

-continued $$(TM)K = (TH)(K - QC) + (QC)(TC) \quad (1)$$
$$(TM)K = (TH)K - (TH)(QC) + (QC)(TC)$$
$$(TM)K - (TH)K = QC(TC - TH)$$
$$K(TM - TH) = QC(TC - TH)$$
$$K(TH - TM) = QC(TH - TC), \text{ and}$$
$$TH - TM = \frac{1}{K}(QC)(TH - TC).$$

Also, from $q$ = $W(CP)\Delta T$, and since $W$ and $Q$ are constant $q$ = $QK(CP)(TH - TC)$ BTU/Hour
And where $(CP)$ = 1 over the range of interest (use of water),
$q$ = $KQ(TH - TC)$ BTU/Hour.

We assume the orifice coefficient of $A = B$ and the $\Delta P$ across both $A$ and $B$ are constant so that $Q = K(QC)$.

Therefore, from equation (1)

$$TH - TM = \frac{1}{K}(QC)(TH - TC)$$

$$TH - TM = \frac{(QC)}{K}(TH - TC)$$

$$TH - TM = KQ(TH - TC)$$
$$TH - TM = Q \text{ BTU/Hour}.$$

Accordingly, TH-TM is equal to the flow times the temperature difference, which is the BTU. If TH is held constant as well as total flow QT then TH-TM is a measure of the energy required by the system to maintain the water temperature at TH for various flows QC. Thus, TM is a linear function of the heat transfer requirements. The apparatus and diagram shown in FIG. 4 and the temperature control system in general is newly devised based on this concept. While the '547 patent to the present applicant used a spring loaded device and a feed forward signal without a feedback control device, the present apparatus includes, unlike the '547 patent, a continuously running pump 70 to produce the constant flow QT=K, a feedback control device and a hydraulic zero adjuster 78.

In a particular apparatus, the thermal measuring means 58 includes sensor TM 68, which measures the temperature of the mixture of TH and TC, the temperatures of the hot output and cold inlet waters, respectively. In order to establish QT=C the pump 70 and three limiting orifices 72, 74, 76 are used. The three orifices 72, 74, 76 function as resistance to restrict the flow of water, and preferably give a pressure drop of 2 psi at design flow for a particular BTU at approximately 20 gallons/minute. Pump 70 is provided to continuously pump to fix the rate of flow at ½ gallon of water per minute.

As shown, pump 70 draws both hot water and cold water through channels A and B. At zero flow (QC=0), if the system were perfect (as desired) then the signal TH-TM would be 0 (TH would equal TM). However, while orifice 74 provides resistance to TC, because TH is met with some resistance (from its flow) some TC is still capable of mixing with TH. To avoid this (and obtain the desired zero flow (QC)) hydraulic zero adjuster 78 is provided, which hydraulically pulls the cold water that flows through orifice 74 at no flow down channel C to bypass orifice 72, allowing flow of TH only through orifice 72 for sensor TM. As a result, there is no flow at point X, and TH=TM. See FIG. 4A, which shows that the change in TS, the control signal based upon output from the BTU rate transmitter (as described below), is proportional to the change in QC even when flow is below 10% of maximum. The hydraulic zero adjuster 78 and pump 70 make this possible.

As the water flow of the incoming cold water and outgoing hot water varies through the water chamber 18 and specifically channel 19, the bulk average temperature (resulting from mixing the hot and cold fluid streams) TM varies proportionally. This occurs because as flow is increased and water is drawn through the unit, a pressure drop occurs at point Y across orifice 76, and as a result, cold water is drawn through channel B and mixed with the hot water causing TM to decrease. When a sudden change in flow is made, TM changes very rapidly (within the ability of the system to respond to the flow). The control system responds to TM generated by the BTU rate transmitter 58 and functions to send a signal TS as shown in FIG. 4B to effect the immediate repositioning of the air/gas valve 64 to increase energy supply.

Unlike prior systems, the error of water temperature control is kept minimal. The error that exists results from the minor delay, i.e., time the system sensed the water temperature change and the time it took to open the valves to supply more energy. These delays, however, are offset, unlike instantaneous systems, with the buffer of additional water, which is enough to absorb the error and allow the control system to remain within its temperature control specifications.

Figure 4B:
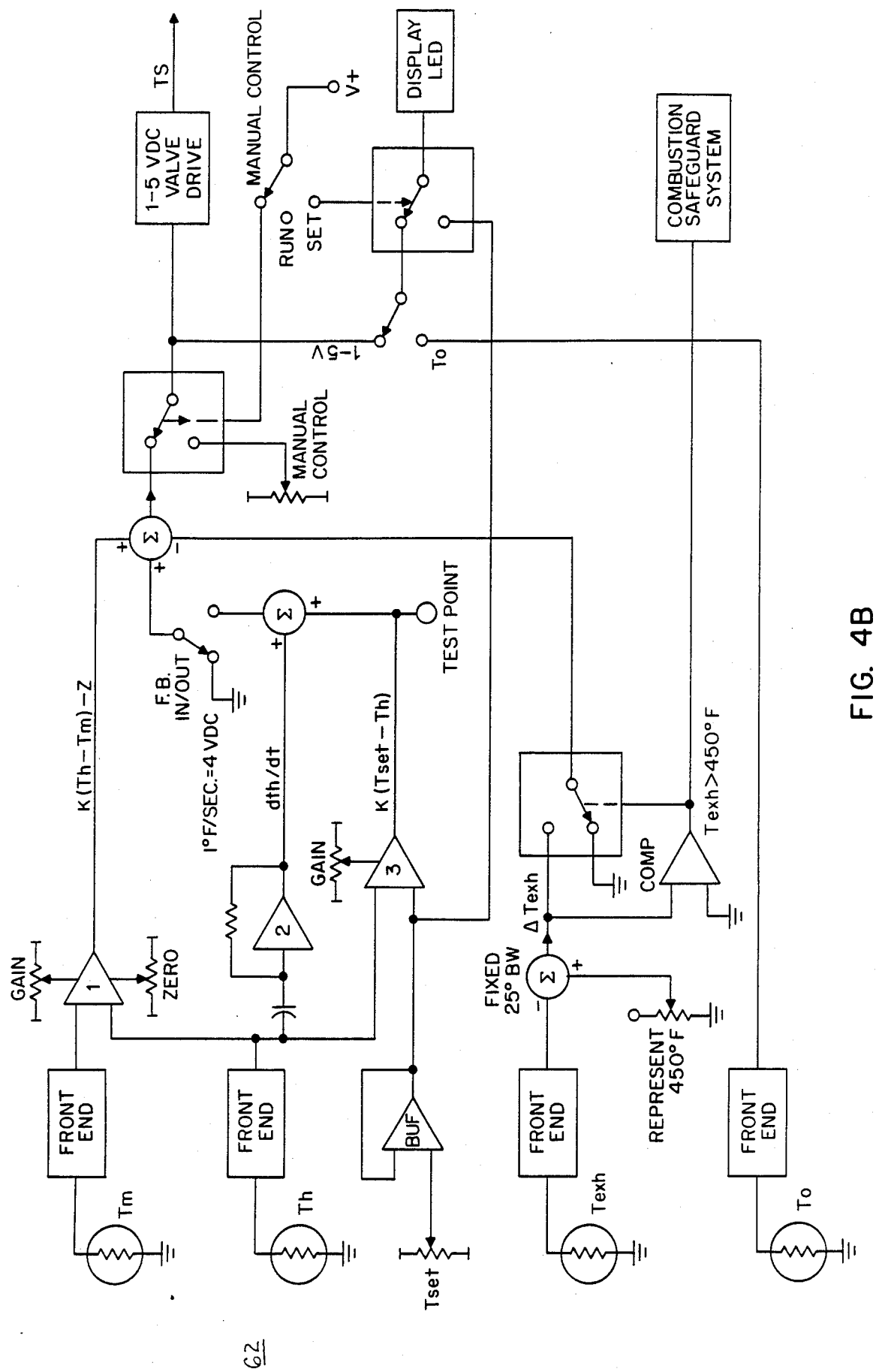
FIG. 4B is a block diagram of the control system and other features of the gas fired water heater system in accordance with the present invention.
Figure 5:
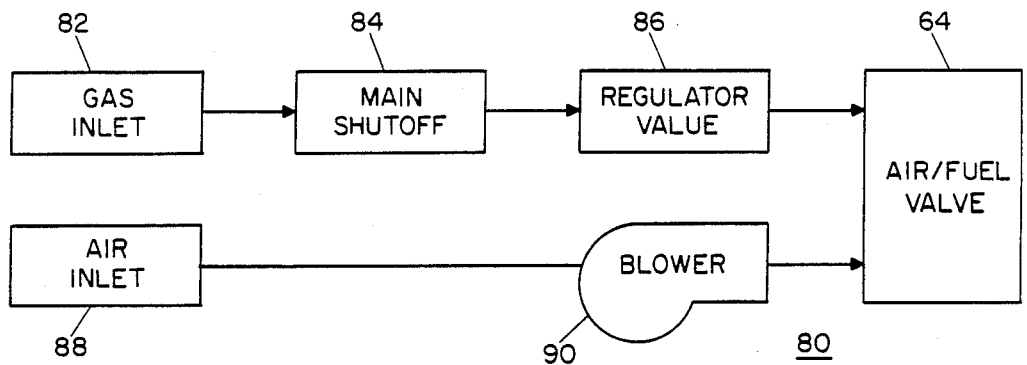
FIG. 5 is a block diagram of the air/fuel train means for the gas fired water heater system in accordance with the present invention.

Referring to FIG. 4B, the control system 62 is responsive to the sensed temperature for controlling the rate of heat transfer between the hot gases and the water. It includes signal means which generates a signal TS and air/fuel train means 80 responsive to the signal TS for providing separate flow of air and gas to the combustor 34. The air/fuel train 80, shown in block diagram in FIG. 5, preferably comprises and air/fuel valve 64, a gas inlet 82 to allow for incoming natural gas, a main shutoff valve 84 for selectively opening and closing the flow of gas, a regulator valve 86 for holding the pressure drop of the gas constant across the air/fuel valve 64, an air inlet 88, and blower 90 for accelerating the flow of gas.

FIG. 4B shows in block diagram form the operation of the control system of the present invention. In amplifier 1, the TM signal is subtracted from TH to obtain the gain to be reported (the feed forward gain). The feed forward gain and feed forward zero adjustments are used in conjunction with the feed back in/out switch ("FF.B. IN/OUT") to adjust the feed forward system for calibration purposes, i.e. to adjust TH to equal TM. In amplifier 2, the derivative signal (the rate of change of temperature) is derived from the TH signal. The internal set point signal, usually 120° F., is compared against TH in amplifier 3, which creates the feedback signal. The gain of this amplifier is also adjustable. The sum of these three amplifiers are used to create signal TS to position the air/fuel valve 64.

Specifically, for calibration purposes, the system is turned on (for example at 50-90% of load or 500,000 to 900,000 BTU) and placed in an automatic run condition until the temperature is stable. The three amplifiers are used (with the F.B. IN/OUT switch in IN position and not in OUT position as shown) to create signal TS. But, in a stable condition, the temperature is not changing and thus no error between the set point signal and the output occurs. As a result, amplifiers 2 and 3 should not contribute to the TS signal; the only contribution should be from amplifier 1.

To calibrate, a few steps are followed. First, the operation and diagnostic display 100 (shown in FIG. 1A) is used to display the voltage (control signal TS going to the valve to hold the valve in a certain position to maintain a certain temperature). For example, the display may read 4 volts. In a stable environment this 4 volts should only be produced from the feed forward amplifier 1. To test this, the F.B. IN/OUT switch is momentarily placed in the out position, as shown, so that only the feed forward amplifier 1 is input to the valve drive signal TS. If the display still reads 4 volts then the system needs no adjustment. However, if the display reads less than 4 volts then part of the signal TS was being provided as a result of error through the gain amplifier 3. To compensate for this, the feed forward gain amplifier 1 is itself adjusted to produce 4 volts. As a result, the feed forward signal is adjusted and the system is calibrated. The F.B. IN/OUT switch is then placed back into the IN position, ready for operation.

There are other features of the fluid heating device, as shown in FIG. 4B. The combustion safeguard system is responsible for the ignition sequence and monitors the temperature, water level, and gas and air pressure to ensure that the requirements are met for proper combustion. The Tout signal is an independent sensor in the TH probe 66 and may be used in the feed forward amplifier (instead of TH) as well as a display of the outlet water temperature. The Tout represents a point measurement while TH represents an average measurement of points along preferably the last several gallons of outgoing water.

Texh is the exhaust gas limiting signal. When this signal exceeds a pre-set limit of 450° F. it is summed with the amplifiers 1, 2, and 3 and over a 25 degree bandwidth reduces the signal to the air/fuel valve to limit the exhaust gas temperature to 475 degrees. A comparator measuring the temperature difference between the exhaust gas and the pre-set limit generates a logic signal that activates an indicator light in the combustion safeguard system if Texh is greater than the pre-set limit. In addition, FIG. 4B shows a switch which allows a manual control signal to replace the automatic control signal allowing the unit to be adjusted for purposes of setup and calibration. The display 100 can also be switched to indicate the control signal, the outlet water temperature or the set point temperature.

Figure 6:
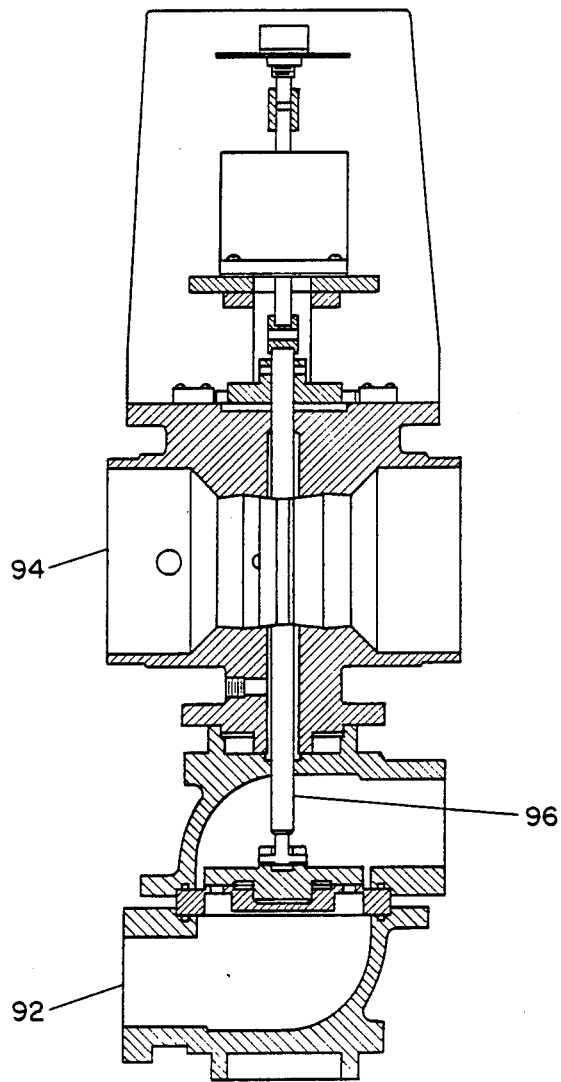
FIG. 6 is a diagrammatic view of the air/fuel valve for the gas fired water heater system in accordance with the present invention.

Referring to FIG. 6, the air/fuel valve 64 comprises preferably a rotary valve having a gas flow inlet 92 and an air flow inlet 94. Area openings for each flow are provided to allow for separate but relatively proportional flow to the combustor 34 and specifically to the gas entry 57 and air entry 55 thereof. An air/fuel valve shaft 96 connects the two openings. The air/fuel valve's rotation or change in area of opening is preferably linearly responsive to the generated signal corresponding to the sensed temperature of the sample mixture, and the gas flow is linear with rotation as a result of regulator valve 86. Preferably, the separate flows of air and gas to the combustor 34 are at a substantially constant air/gas ratio producing excess oxygen of 5%. This ratio has been found to create the best mixture for combustion.

Figure 7:
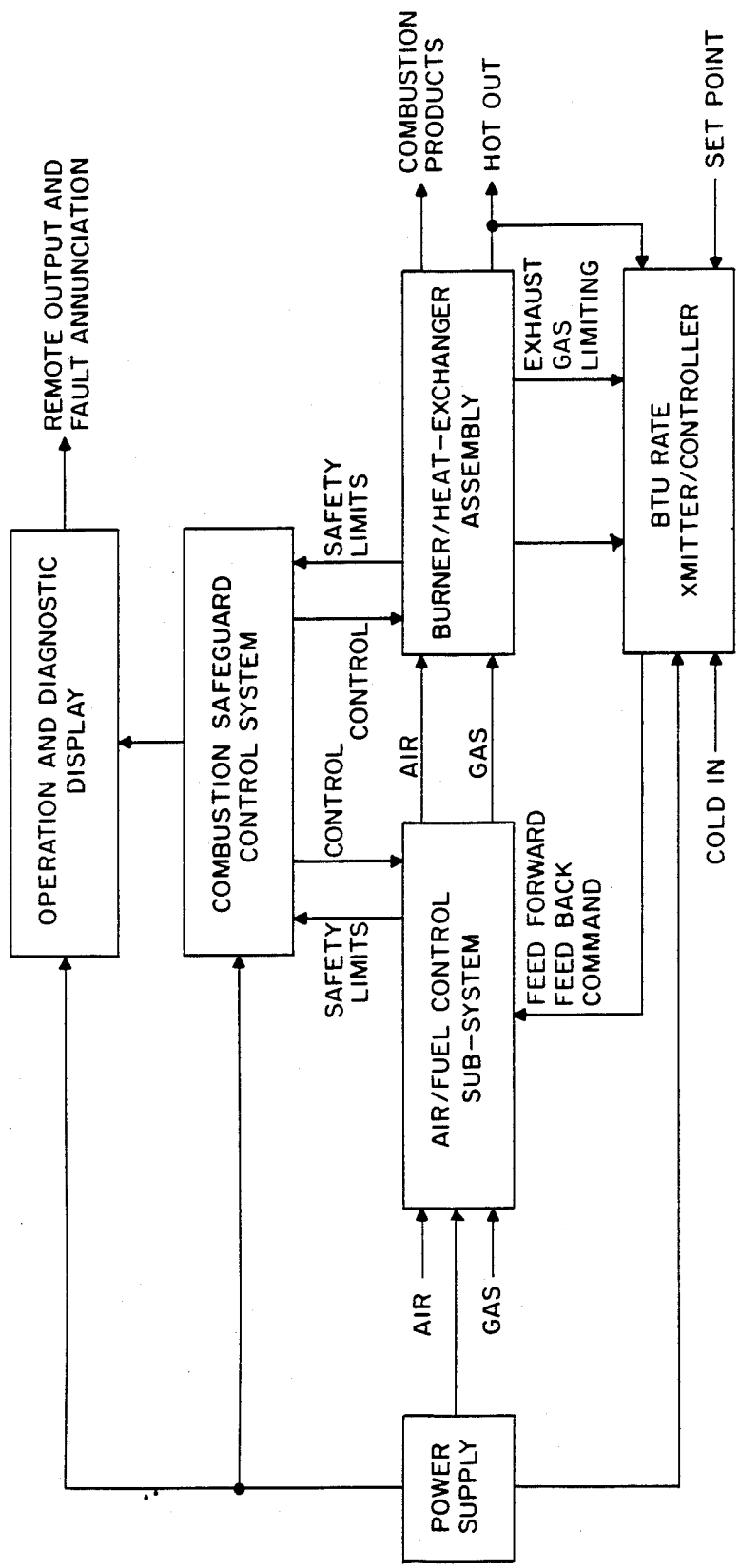
FIG. 7 is a block diagram of the gas fired water heater system in accordance with the present invention.

A block diagram of the fluid heating system described above is shown in FIG. 7. It comprises the BTU rate transmitter/controller 58, the burner 34 in combination with heat-exchanger 12, the air/fuel control system 62, the combustion safeguard control system, and the operation and diagnostic display 100. As can be seen, separate flows of air and gas are provided by the air/fuel system 80 to the burner 34 for combustion through the heat exchanger. The BTU rate transmitter 58 obtains its information from the inlet and outlet water of the heat exchanger. The control system generates a signal to this air/fuel valve for modulating the flow of air and gas to the combustor.

Thus there is provided in accordance with the invention a novel and highly effective gas fired water heater system wherein a combined feedback and feed forward control is established that minimizes fluctuations in the temperature of the hot water by anticipating changes in BTU requirements. The system, including the combustion chamber, surrounding tubes, the combustor, and the temperature control system including the BTU rate transmitter, controls and air/fuel train operates automatically in response to the flow of the water as delivered by the mains, thus ensuring extraordinary efficiency, effectiveness and reliability.

Many modifications of the representative embodiments of the invention disclosed above will readily occur to those skilled in the art upon consideration of this disclosure, including use of the systems as space heating boilers. The invention is accordingly not limited to the specific embodiments thereof disclosed herein but includes all structure which is within the scope of the following claims, and equivalents thereof.

I claim:

1. A heating device comprising:
   combustion means for igniting a combustible mixture of air and gas to provide a first fluid for heating a second fluid;
   heat exchanger means for providing heat transfer between said first and second fluids, said exchanger means including a combustion chamber for receiving the first fluid, a water chamber having an inlet and outlet between which said second fluid passes, said water chamber enclosing the combustion chamber, and a plurality of exchange tubes formed through, extending from and surrounding said combustion chamber such that the first fluid travels through the combustion chamber and tubes in physical isolation from and in heat exchange relation with said second fluid which passes on the outside of said combustion chamber and tubes within the water chamber;
   temperature control means for controlling the temperature of the fluids, including thermal measuring means having a sensor for sensing the temperature of a mixture of incoming and outgoing portions of said second fluid, and controlling means responsive to the sensed temperature for controlling the rate of heat transfer between the fluids by modulating the flow of air and gas to said combustion means.

2. The heating device of claim 1, wherein said thermal measuring means includes flow means for establishing a pressure differential between the incoming and outgoing portions depending on the flow rate of the second fluid such that a relative ratio of the portions depends linearly on the flow rate of the second fluid for flow rates.

3. The heating device of claim 2, wherein said flow means includes a plurality of orifice means to restrict the flow of said second fluid, hydraulic zero adjuster means for hydraulically pulling a first portion of said incoming second fluid so that said first portion bypasses one of the orifice means and said sensor, and pump means for pumping at a fixed rate a second portion of said second fluid, said second portion including said first portion, whereby the temperature of the outgoing portion equals the sensed temperature at zero flow.

4. The heating device of claim 3, wherein there are three orifice means each adapted to restrict the flow of three respective portions of said second fluid.

5. The heating device of claim 1, wherein the plurality of exchange tubes comprise substantially equally spaced apart exchange tubes each extending helically around the combustion chamber from the top thereof to the bottom thereof such that the first fluid travels upwards through the combustion chamber and downwards through the tubes in counterflow to the second fluid travelling upwards through the water chamber.

6. The heating device of claim 5, wherein said tubes extend helically around the combustion chamber without supporting baffles.

7. The heating device of claim 5, wherein said fluids are at different temperatures such that a temperature gradient is established in the second fluid in the direction of its flow and that the first fluid is cooled in traversing, downwards through the tubes, the second fluid below the dew point of first fluid causing the vapor in the first fluid to condense in the tubes.

8. The heating device of claim 1, wherein said controlling means includes signal means for generating a signal derived from the sensed temperature, and air/fuel means responsive to said signal for modulating the flow of air and gas to said combustion means.

9. The heating device of claim 8, wherein said signal means includes feed forward means for subtracting the sensed temperature from the temperature of the outgoing portion of said second fluid, derivative means for calculating the rate of temperature change of said second fluid, feedback means for subtracting the temperature of the outgoing portion of said second fluid from a set point predetermined temperature, and summation means for generating said signal based upon the summation of the values generated by said feed forward means, derivative means and feedback means.

10. The heating device of claim 8 or 9, wherein said air/fuel means includes an air/fuel valve with rotation linearly responsive to said signal to forward separate flows of air and gas to said combustion means at a substantially constant air/gas ratio maintained at a programmed relationship as a function of input gas flow.

11. The heating device of claim 10 wherein said gas flow is linear with rotation of the air/fuel valve.

12. The heating device of claim 11, wherein said air/fuel valve is a rotary valve having an air inlet and gas inlet, and said substantially constant air/gas ratio produces excess oxygen of approximately 5%.

13. The heating device of claim 12, wherein said air/fuel means further includes regulator valve means for holding the pressure drop of the gas constant across said air/fuel valve such that a linear flow of gas is established through the air/fuel valve.

14. The heating device of claim 13, wherein said air/fuel means further comprises:
   gas inlet means for providing the incoming flow of gas;
   a gas valve for selectively opening and closing the flow of gas;
   air inlet means for providing the incoming flow of air;

blower means for accelerating the flow of air into said air inlet of the valve.

15. The heating device of claim 10, wherein said combustion means comprises a nozzle mix burner.

16. The heating device of claim 15, wherein said nozzle mix burner includes:
   gas pipe means open at its bottom to receive gas from the air/fuel valve, and having a gas cap at its upper end, said cap having at least one gas port for the exit of gas; and
   a cylindrical air chamber enclosing said gas pipe having an outer shell defining an air channel between said shell and said gas pipe means, air entry means formed through the shell for receiving air from the air/fuel valve, and air exit means formed at the upper end of said chamber for providing an exit for air from the channel.

17. The heating device of claim 16, wherein said air exit means includes air ports positioned at the shell of the air chamber, and wherein said gas pipe means has at least one gas tube extending radially outwards from the pipe means towards the outer shell, said tubes providing a conduit for the introduction of gas into an area just above the air ports positioned at the outer shell.

18. The heating device of claim 17, wherein said nozzle mix burner further comprises spinner vanes formed above said air ports positioned at the shell of the air chamber in asymmetric relation with the radial gas tubes, said spinner vanes adapted to spin the mixture of air and gas at a very high velocity at the upper end of the air chamber.

19. The heating device of claim 1, further comprising an exhaust gas means having an exhaust stack and a manifold, said manifold positioned below said heat exchanger means for receiving the exhausted fluids from said tubes and guiding said fluids through said exhaust stack into the atmosphere.

20. The heating device of claim 1, further including combustion safeguard means including means for sensing the temperature of the exhausted first fluid, and means responsive to said sensed exhaust temperature for providing a signal to the controlling means to decrease the rate of heat transfer upon sensing a temperature above a predetermined limit.

21. The heating device of claim 1, wherein said first fluid is gas and said second fluid is water.

22. A gas fired water heater system for supplying water on demand at a substantially constant, controlled temperature, comprising:
   combustion means for igniting a combustible mixture of air and gas to provide a fluid for heating said water;
   heat exchanger means for providing heat transfer between the fluid and the water, said exchanger means including a hollow cylindrical combustion chamber open at its bottom to receive the fluid from said combustion means, a water chamber enclosing the combustion chamber and having an outer shell defining a water channel between the shell and said combustion chamber, said water chamber having an inlet for admitting incoming relatively cool water into the channel and an outlet for withdrawing outgoing relatively hot water from the channel after heat transfer, a plurality of exchange tubes formed through, extending from and surrounding said combustion chamber forming a conduit for the fluid to pass in physical isolation from and in heat exchange relation with the water passing through the water channel such that the fluid travels upwards through the combustion chamber and downwards through the tubes in counterflow to the water travelling upwards through the water channel, said water and fluid being at different temperatures such that a temperature gradient is established in the water in the direction of its flow and that the fluid is cooled in traversing downwards through the tubes, the water below the dew point of the fluid causing the vapor in the fluid to condense;
   temperature control means for controlling the temperature of the water, including thermal measuring means having a sensor for sensing the temperature of a mixture of a sample portion of said incoming water and a sample portion of said outgoing water, said thermal measuring means including flow means for creating a pressure differential between the incoming and outgoing sample portions that depends on the rate of flow of the water in such a way that the relative ratio of the sample portions depends generally linearly on the flow rate of the water, and including controlling means responsive to the sensed temperature for modulating the flow of air and gas to said combustion means.

23. The gas fired water heater system of claim 22, wherein said flow means includes a plurality of orifice means to restrict the flow of said water, hydraulic zero adjuster means for hydraulically pulling a first portion of said incoming water so that said first portion bypasses one of the orifice means and said sensor, and pump means for pumping at a fixed rate a second portion of said water, including said first portion.

24. The gas fired water heater system of claim 23, wherein said controlling means includes signal means for generating a signal based upon the sensed temperature, and air/fuel means responsive to said signal for modulating the flow of air and gas to said combustion means, wherein said signal means includes feed forward means for subtracting the sensed temperature from the temperature of the outgoing portion of the water, derivative means for calculating the rate of temperature change of the water, feedback means for subtracting the temperature of the outgoing portion of water from a set point predetermined temperature, and summation means for generating said signal based upon the summation of the values generated by said feed forward means, derivative means and feedback means.

25. The gas fired water heater system of claim 24, wherein said air/fuel means includes an air/fuel valve with rotation linearly responsive to said signal to forward separate flows of air and gas to said combustion means at a substantially constant air/gas ratio maintained at a programmed relationship as a function of input gas flow, said gas flow being linear with rotation of the air/fuel valve.

26. The gas fired water heater system of claim 25, wherein said air/fuel means further comprises regulator valve means for holding the pressure drop of the gas constant across said air/fuel valve such that a linear flow of gas is established through the air/fuel valve.

27. A direct fired water heater system having combustion means for igniting a combustible mixture of air and gas to provide a first fluid for heating a second fluid, heat exchanger means for providing heat transfer between said first and second fluids, said heat exchanger including a combustion chamber for receiving the first fluid and a water chamber enclosing the combustion chamber, and temperature control means for controlling the temperature of the fluids including thermal measuring means having a sensor for sensing the temperature of a mixture of incoming and outgoing portions of said second fluid and controlling means responsive to the sensed temperature for controlling the rate of heat transfer between the fluids, wherein said heat exchanger means further includes a plurality of substantially equally spaced apart exchange tubes formed through, extending from and surrounding said combustion chamber creating a conduit such that the first fluid travels upwards through the combustion chamber, downwards through the tubes in counterflow to the second fluid travelling upwards through the water chamber, wherein said fluids are at different temperatures such that a temperature gradient is established in the second fluid in the direction of its flow and that the first fluid is cooled in traversing, downwards through the tubes, the second fluid below the dew point of first fluid causing the vapor in the first fluid to condense, and wherein said controlling means controls the rate of heat transfer between the fluids by modulating the flow of air and gas to said combustion means.

28. The direct fired water heater system of claim 27, wherein there are 48 equally spaced apart exchange tubes.

29. A direct fired water heater system having combustion means for igniting a combustible mixture of air and gas to provide a first fluid for heating a second fluid, heat exchanger means for providing heat transfer between said first and second fluids, said heat exchanger including a combustion chamber for receiving the first fluid and a water chamber enclosing the combustion chamber, and temperature control means for controlling the temperature of the fluids including thermal measuring means having a sensor for sensing the temperature of a mixture of incoming and outgoing portions of said second fluid and controlling means responsive to the sensed temperature for controlling the rate of heat transfer between the fluids, wherein said thermal measuring means includes flow means for establishing a pressure differential between the incoming and outgoing portions depending on the flow rate of the second fluid such that a relative ratio of the portions depends linearly on the flow rate of the second fluid for flow rates, and wherein said flow means includes a plurality of orifice means to restrict the flow of said second fluid, hydraulic zero adjuster means for hydraulically pulling a first portion of said incoming second fluid so that said first portion bypasses one of the orifice means and said sensor, and pump means for pumping at a fixed rate a second portion of said second fluid, said second portion including said first portion.

30. A direct fired water heater system having combustion means for igniting a combustible mixture of air and gas to provide a first fluid for heating a second fluid, heat exchanger means for providing heat transfer between said first and second fluids, said heat exchanger including a combustion chamber for receiving the first fluid and a water chamber enclosing the combustion chamber, and temperature control means for controlling the temperature of the fluids including thermal measuring means having a sensor for sensing the temperature of a mixture of incoming and outgoing portions of said second fluid and controlling means responsive to the sensed temperature for controlling the rate of heat transfer between the fluids, wherein said controlling means includes signal means for generating a signal based upon the sensed temperature, and air/fuel means responsive to said signal for modulating the flow of air and gas to said combustion means, wherein said signal means includes feed forward means for subtracting the sensed temperature from the temperature of the outgoing portion of said second fluid, derivative means for calculating the rate of temperature change of said second fluid, feedback means for subtracting the temperature of the outgoing portion of said second fluid from a set point predetermined temperature, and summation means for generating said signal based upon the summation of the values generated by said feed forward means, derivative means and feedback means.

31. The direct fired water heater system of claim 30, wherein said air/fuel means includes an air/fuel valve with rotation linearly responsive to said signal to forward separate flows of air and gas to said combustion means at a substantially constant air/gas ratio maintained at a programmed relationship as a function of input gas flow, said gas flow being linear with rotation of the air/fuel valve.

32. The direct fired water heater system of claim 31, wherein said air/fuel means further comprises regulator valve means for holding the pressure drop of the gas constant across said air/fuel valve such that a linear flow of gas is established through the air/fuel valve.

33. A direct fired water heater system having combustion means for igniting a combustible mixture of air and gas to provide a first fluid for heating a second fluid, heat exchanger means for providing heat transfer between said first and second fluids, said heat exchanger including a combustion chamber for receiving the first fluid and a water chamber enclosing the combustion chamber, and temperature control means for controlling the temperature of the fluids including thermal measuring means having a sensor for sensing the temperature of a mixture of incoming and outgoing portions of said second fluid and controlling means responsive to the sensed temperature for controlling the rate of heat transfer between the fluids, wherein said combustion means comprises a nozzle mix burner including a cylindrical air chamber enclosing an elongated gas pipe, said air chamber having an outer shell defining an air channel between said shell and gas pipe, through which air travels and exits at ports formed at the upper end of the chamber and at the periphery thereof, said gas pipe open at its bottom to receive gas from said controlling means and having a gas cap at its upper end with at least one gas port for the exit of gas, and wherein said air exit means includes air ports positioned at the shell of the air chamber, and wherein said gas pipe means has at least one gas tube extending radially outwards from the pipe means towards the outer shell, said tubes providing a conduit for the introduction of gas into an area just above the air ports positioned at the outer shell, and wherein said nozzle mix burner further comprises spinner vanes formed above said air ports positioned at the shell of the chamber in asymmetric relation with the radial gas tubes, said spinner vanes adapted to spin the mixture of air and gas at a very high velocity at the upper end of the chamber.

34. A direct fired water heater system having combustion means for igniting a combustible mixture of air and gas to provide a first fluid for heating a second fluid, heat exchanger means for providing heat transfer between said first and second fluids, said heat exchanger including a combustion chamber for receiving the first fluid and a water chamber enclosing the combustion chamber, and temperature control means for controlling the temperature of the fluids including thermal measuring means having a sensor for sensing the temperature of a mixture of incoming and outgoing portions of said second fluid and controlling means responsive to the sensed temperature for controlling the rate of heat transfer between the fluids by modulating the flow of air and gas to said combustion means, wherein said combustion means comprises a nozzle mix burner for receiving the air and gas from the controlling means and for providing over a range of flow of air and gas said first fluid at a high energy release rate greater than 500,000 BTU/hour/cubic foot of volume.

* * * * *

UNITED STATES PATENT AND TRADEMARK OFFICE
CERTIFICATE OF CORRECTION

PATENT NO. : 4,852,524

DATED : August 1, 1989

INVENTOR(S) : Kenneth W. Cohen

It is certified that error appears in the above-identified patent and that said Letters Patent is hereby corrected as shown below:

```
First page, penultimate line of ABSTRACT, "due" should read
   --dew--;
Column 1, line 21, "increase" should read --increased--;
Column 3, line 8, "due" should read --dew--;
Column 5, line 64, ";or" should read --for--;
Column 6, line 9, "cites" should read --sites--;
Column 7, line 32, "Referring to ..." should start a new
   paragraph;
Column 9, line 39, "and" should read --an--;
Column 9, line 52, "FF.B" should read --F.B.--; and
Column 9, line 59, "are" should read --is--.
```

Signed and Sealed this

Fifteenth Day of January, 1991

Attest:

HARRY F. MANBECK. JR.

*Attesting Officer*     *Commissioner of Patents and Trademarks*